United States Patent
Tsaur

(10) Patent No.: US 10,853,184 B1
(45) Date of Patent: Dec. 1, 2020

(54) GRANULAR RESTORE VIEW USING OUT-OF-BAND CONTINUOUS METADATA COLLECTION

(71) Applicant: EMC Corporation, Hopkinton, MA (US)

(72) Inventor: Ynn-Pyng Anker Tsaur, Cupertino, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 431 days.

(21) Appl. No.: 14/754,065

(22) Filed: Jun. 29, 2015

(51) Int. Cl.
  *G06F 11/14* (2006.01)
  *G06F 16/951* (2019.01)

(52) U.S. Cl.
  CPC ...... *G06F 11/1451* (2013.01); *G06F 11/1464* (2013.01); *G06F 16/951* (2019.01); *G06F 2201/80* (2013.01)

(58) Field of Classification Search
  CPC .................................................. G06F 11/1451
  See application file for complete search history.

(56) References Cited

U.S. PATENT DOCUMENTS

| | | | |
|---|---|---|---|
| 2014/0372378 A1* | 12/2014 | Long | G06F 11/1451 707/646 |
| 2016/0314046 A1* | 10/2016 | Kumarasamy | G06F 11/00 |

* cited by examiner

*Primary Examiner* — Van H Oberly
(74) *Attorney, Agent, or Firm* — Dergosits & Noah LLP; Todd A. Noah

(57) ABSTRACT

Disclosed are systems and methods for using a metadata agent to collect metadata from a client computer system and including receiving the metadata associated with files used by applications executing in the client computer system. The metadata belong to objects stored in a volume associated with the client computer system. The metadata is collected in real time by the metadata agent executing in the client computer system as a background task. The metadata is stored in a metadata base associated with a metadata server. A request to search the metadata is received from a backup server associated with the metadata server. The search request includes search criteria. A search engine associated with the metadata server searches the metadata in the metadata database to find a match based on the search criteria. A search result is transmitted from the metadata server to the backup server which uses the search result to search for objects in the backup data.

17 Claims, 6 Drawing Sheets

GRANULAR RESTORE VIEW USING OUT-OF-BAND CONTINUOUS METADATA COLLECTION

BACKGROUND

The present invention relates to the field of information technology, including, more particularly, to systems and techniques for collecting metadata associated with files inside a backup image of computer systems.

Large organizations, such as businesses, often back up their data for potential disaster recovery. The backup may be performed initially as a full back up and subsequently as incremental backups. For the virtualized environments, the backups may be performed using a block-based approach. The block-based backup approach may enable fast backing up of an entire volume of a disk. The backup data may be saved as one file or backup image and can be used for fast restoration of the entire volume. One problem with the block-based approach is that the backup system does not distinguish the data in the files from the metadata associated with those files.

Currently, to get the metadata, post processing of the backup image is necessary. For example, after a backup is completed, the backup image may need to be mounted and processed to identify the files and their associated metadata. This post processing approach to get the metadata is time consuming and resource intensive. Further, the metadata identified using the post processing approach may not be up-to-date because the metadata is based on a completed backup.

DETAILED DESCRIPTION

For some embodiments, a metadata agent may be configured to collect the metadata of files and corresponding incremental changes in the metadata of those files in real time and independently of when the files are backed up. The metadata agent may be configured to reside and execute in a client system. The collected metadata and corresponding incremental changes may then be transmitted to a metadata server using a channel that is independent of how the backup data is transmitted to the backup server. The collected metadata may then be associated with the backup metadata associated with a backup server to enable the backup server to process the backup data.

Figure 1:
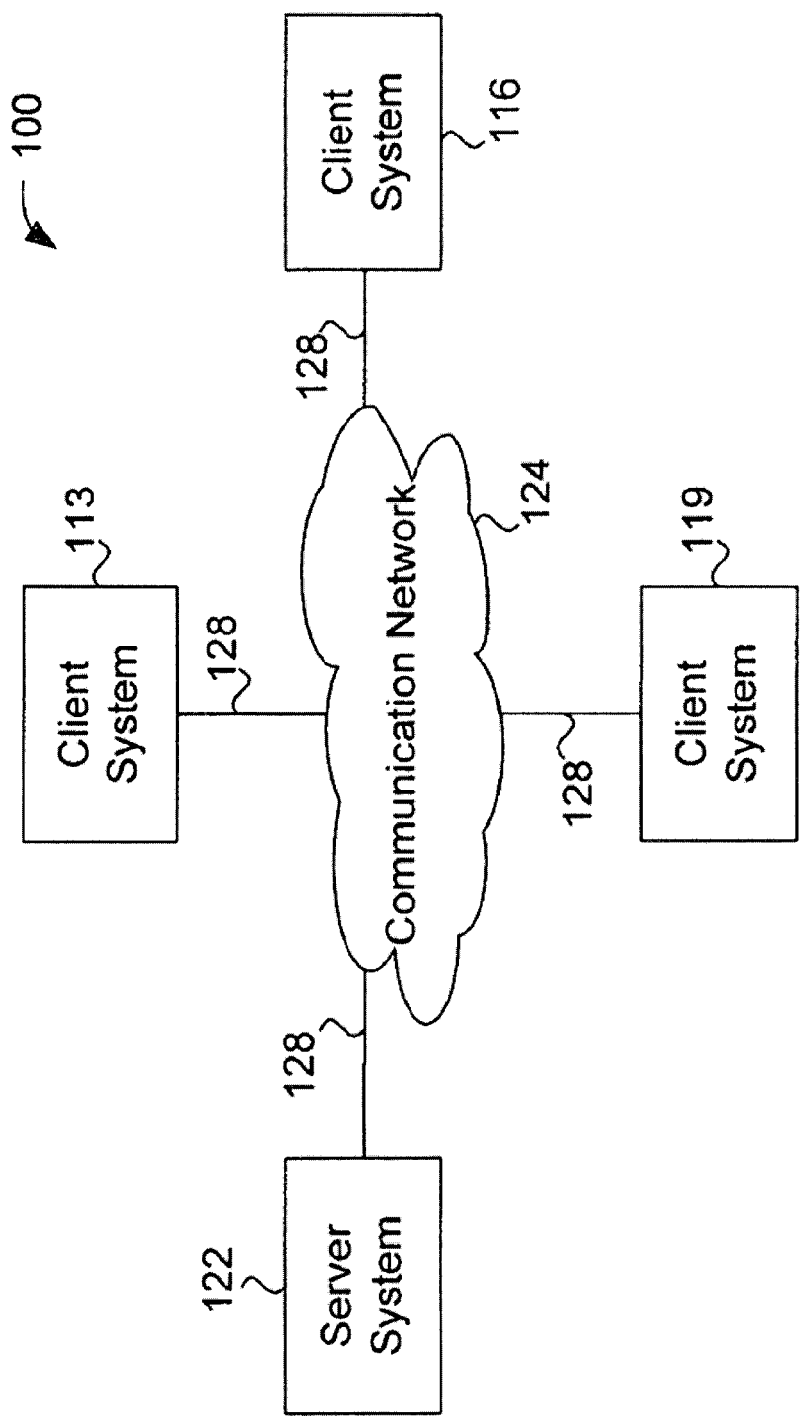
FIG. 1 shows a block diagram of a client-server system and network, implemented in accordance with an exemplary embodiment.

Prior to describing the subject matter in detail, an exemplary computer network in which the subject matter may be implemented shall first be described. Those of ordinary skill in the art will appreciate that the elements illustrated in FIG. 1 may vary depending on the system implementation. With reference to FIG. 1, FIG. 1 is a simplified block diagram of a distributed computer network 100. Computer network 100 includes a number of client systems 113, 116, and 119, and a server system 122 coupled to a communication network 124 via a plurality of communication links 128. There may be any number of clients and servers in a system. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, a intranet, a private network, a public network, a switched network, and combinations of these, and the like.

Distributed computer network 100 in FIG. 1 is merely illustrative of an embodiment and is not intended to limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server system which provides the information. For this reason, server systems typically have more computing and storage capacity than client systems. However, a particular computer system may act as a client or a server depending on whether the computer system is requesting or providing information. Additionally, although aspects of the invention have been described using a client-server environment, it should be apparent that the invention may also be embodied in a stand-alone computer system. Aspects of the invention may be embodied using a client-server environment or a cloud-computing environment.

Server 122 is responsible for receiving information requests from client systems 113, 116, and 119, performing processing required to satisfy the requests, and for forwarding the results corresponding to the requests back to the requesting client system. The processing required to satisfy the request may be performed by server system 122 or may alternatively be delegated to other servers connected to communication network 124.

Client systems 113, 116, and 119 enable users to access and query information stored by server system 122. In a specific embodiment, a "Web browser" application executing on a client system enables users to select, access, retrieve, or query information stored by server system 122. Examples of web browsers include the Internet Explorer® browser program provided by Microsoft® Corporation, and the Firefox® browser provided by Mozilla® Foundation, and others.

Figure 2:
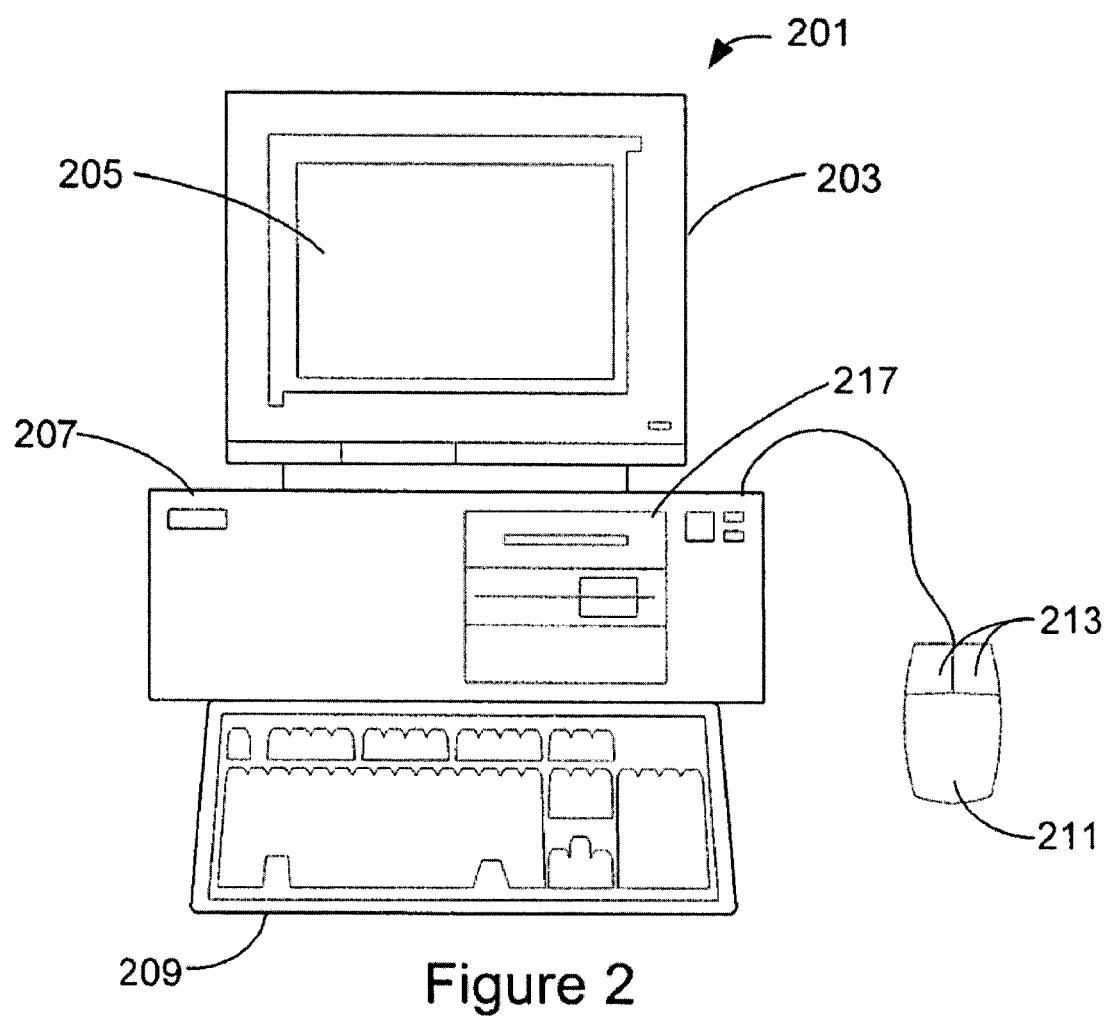
FIG. 2 shows a more detailed diagram of an exemplary client or computer, implemented in accordance with an exemplary embodiment.

FIG. 2 shows an exemplary client or server system. In an embodiment, a user interfaces with the system through a computer workstation system, such as shown in FIG. 2. While FIG. 2 illustrates a computer workstation, the user can interface with the system through a mobile device such as a mobile phone, laptop computer or computer tablet. FIG. 2 shows a computer system 201 that includes a monitor 203, screen 205, cabinet 207, keyboard 209, and mouse 211. Mouse 211 may have one or more buttons such as mouse buttons 213. Cabinet 207 houses familiar computer components, some of which are not shown, such as a processor, memory, mass storage devices 217, and the like.

Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc®), flash and other nonvolatile solid-state storage (e.g., USB flash drive), battery-backed-up volatile memory, tape storage, reader, and other similar media, and combinations of these.

A computer-implemented or computer-executable version of various implementations may be embodied using, stored on, or associated with computer-readable medium or non-transitory computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of software may be stored or reside in RAM or cache memory, or on mass storage device 217. The source code of the software may also be stored or reside on mass storage device 217 (e.g., hard disk, magnetic disk, tape, or CD-ROM). As a further example, code may be transmitted via wires, radio waves, or through a network such as the Internet.

Figure 3:
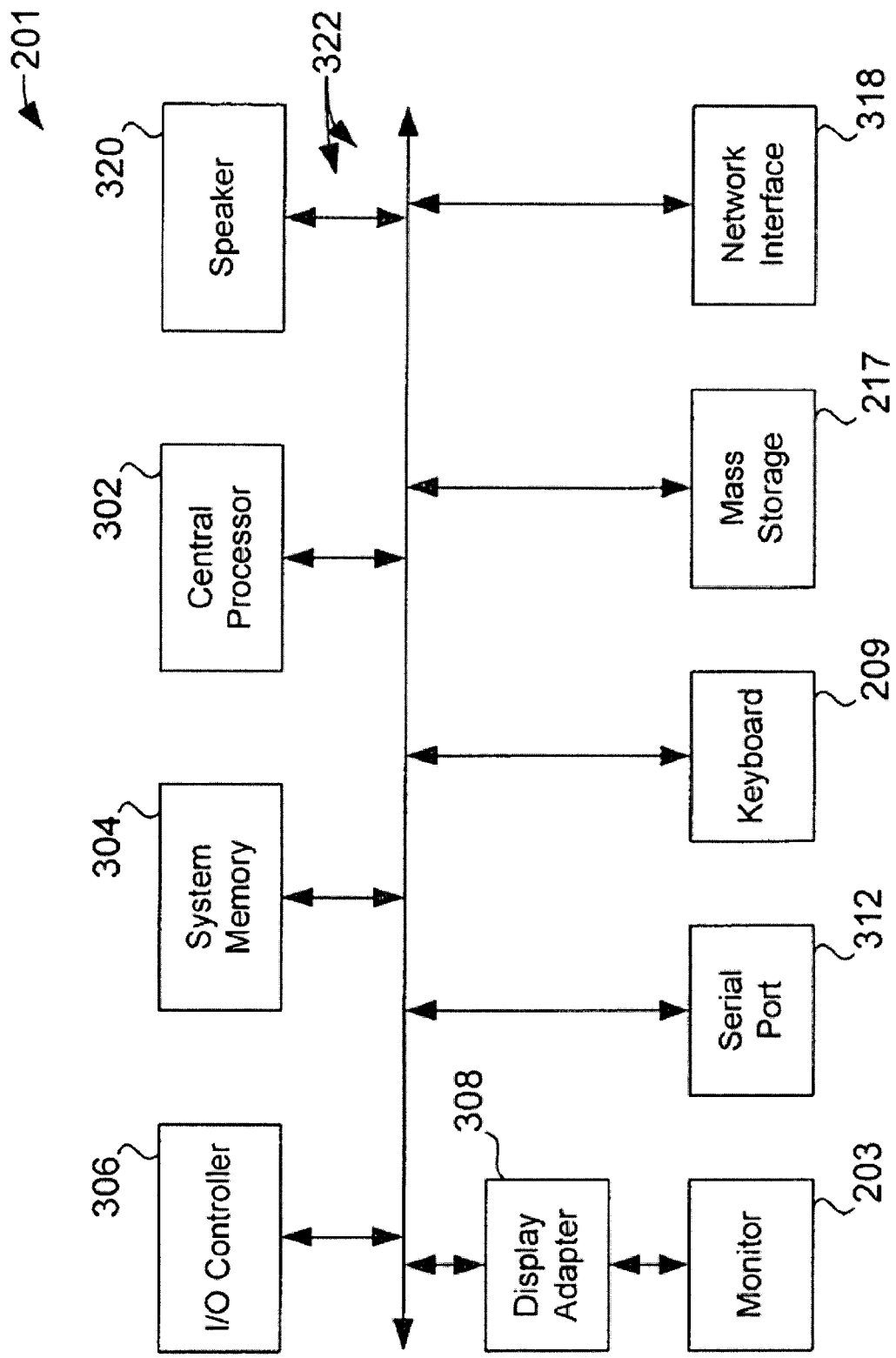
FIG. 3 shows a system block diagram of a client computer system, implemented in accordance with an exemplary embodiment.

FIG. 3 shows a system block diagram of computer system 201. As in FIG. 2, computer system 201 includes monitor 203, keyboard 209, and mass storage devices 217. Computer system 201 further includes subsystems such as central processor 302, system memory 304, input/output (I/O) controller 306, display adapter 308, serial or universal serial bus (USB) port 312, network interface 318, and speaker 320. In an embodiment, a computer system includes additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a suitable computer system. Other configurations of subsystems suitable for use will be readily apparent to one of ordinary skill in the art.

Computer software products may be written in any of various suitable programming languages, such as C, C++, C #, Pascal, Fortran, Perl, Matlab® (from MathWorks), SAS, SPSS, JavaScript®, AJAX, Java®, SQL, and XQuery (a query language that is designed to process data from XML files or any data source that can be viewed as XML, HTML, or both). The computer software product may be an independent application with data input and data display modules. Alternatively, the computer software products may be classes that may be instantiated as distributed objects. The computer software products may also be component software such as Java Beans® (from Oracle Corporation) or Enterprise Java Beans® (EJB from Oracle Corporation). In a specific embodiment, the present invention provides a computer program product which stores instructions such as computer code to program a computer to perform any of the processes or techniques described.

An operating system for the system may be one of the Microsoft Windows® family of operating systems (e.g., Windows 95®, 98, Me, Windows NT®, Windows 2000®, Windows XP®, Windows XP® x64 Edition, Windows Vista®, Windows 7®, Windows CE®, Windows Mobile®), Linux, HP-UX, UNIX, Sun OS®, Solaris®, Mac OS X®, Alpha OS®, AIX, IRIX32, or IRIX64. Other operating systems may be used. Microsoft Windows® is a trademark of Microsoft® Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of the system using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

Figure 4:
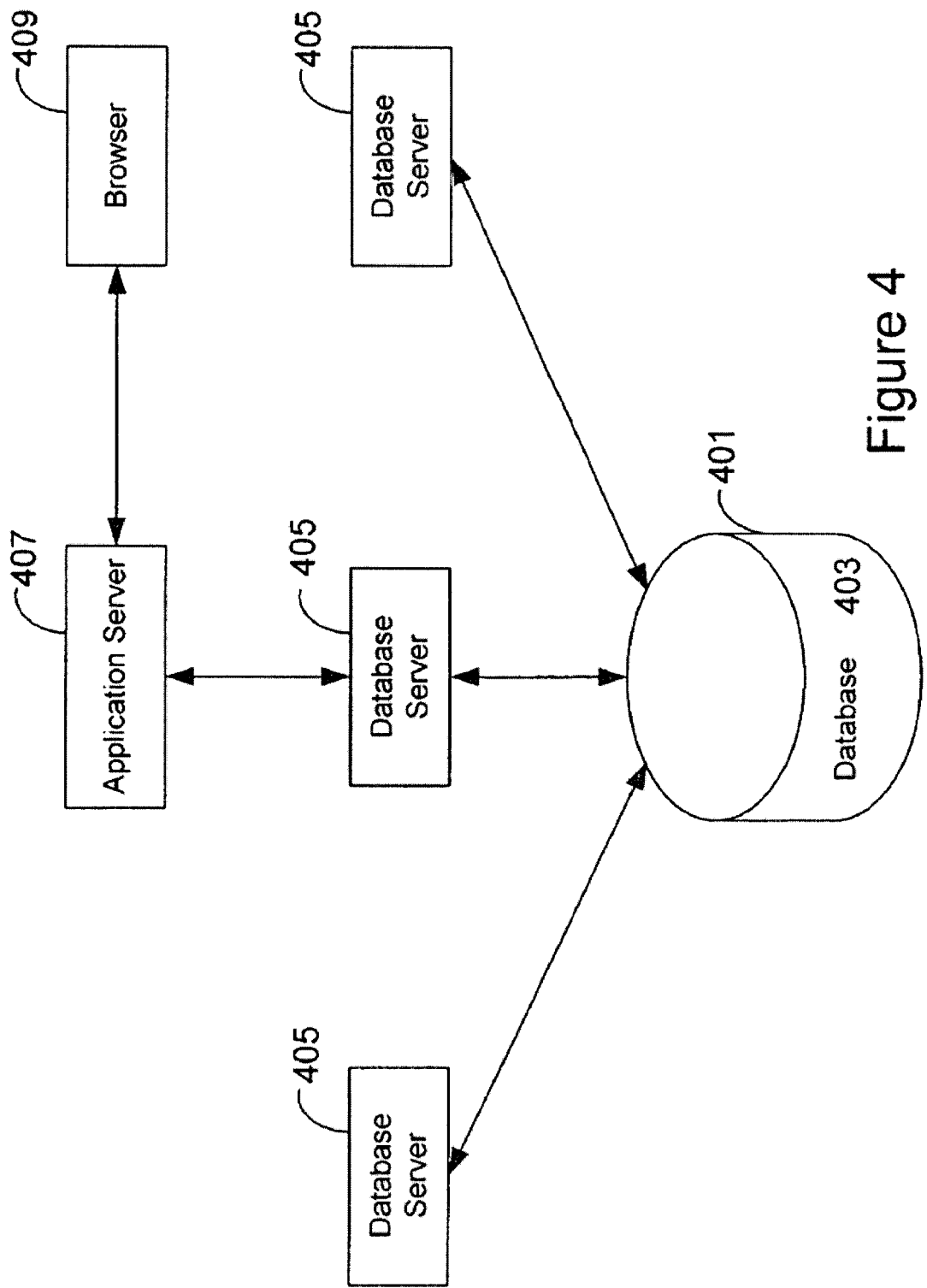
FIG. 4 shows a data source or data service in the form of a database system, implemented in accordance with an exemplary embodiment.

FIG. 4 shows a data source or data service in the form of a database system. A database may be part of a database management system. One suitable database management system architecture is a three-tiered architecture as shown.

In a first tier is the core of a database management system, a central storage 401 that holds or stores a database or repository 403. The database typically resides on one or more hard drives, and is generally part of a larger computer system. The information may be stored in the database in a variety of formats. An example is an Extensible Markup Language (XML) database. An XML database is a data persistence software system that allows data to be stored in XML format. Another example is a relational database management system (RDMS) which uses tables to store the information.

In a second tier are database servers 405. The database servers are instances of a program that interacts with the database. Each instance of a database server may, among other features, independently query the database and store information in the database. Depending on the implementation, the database servers 405 may or may not include user-friendly interfaces, such as graphical user interfaces.

In a third tier is an application server 407. There may be multiple application servers. In an implementation, the application server provides the user interfaces to the database servers. By way of example, the application server may be a web application server on the Internet or any other network. The application server may also be a virtual database server or a virtual directory server. The application server may provide user-friendly mechanisms and interfaces for accessing the database through the database servers. In an implementation, a web browser 409 is utilized to access the application server.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context.

Figure 5:
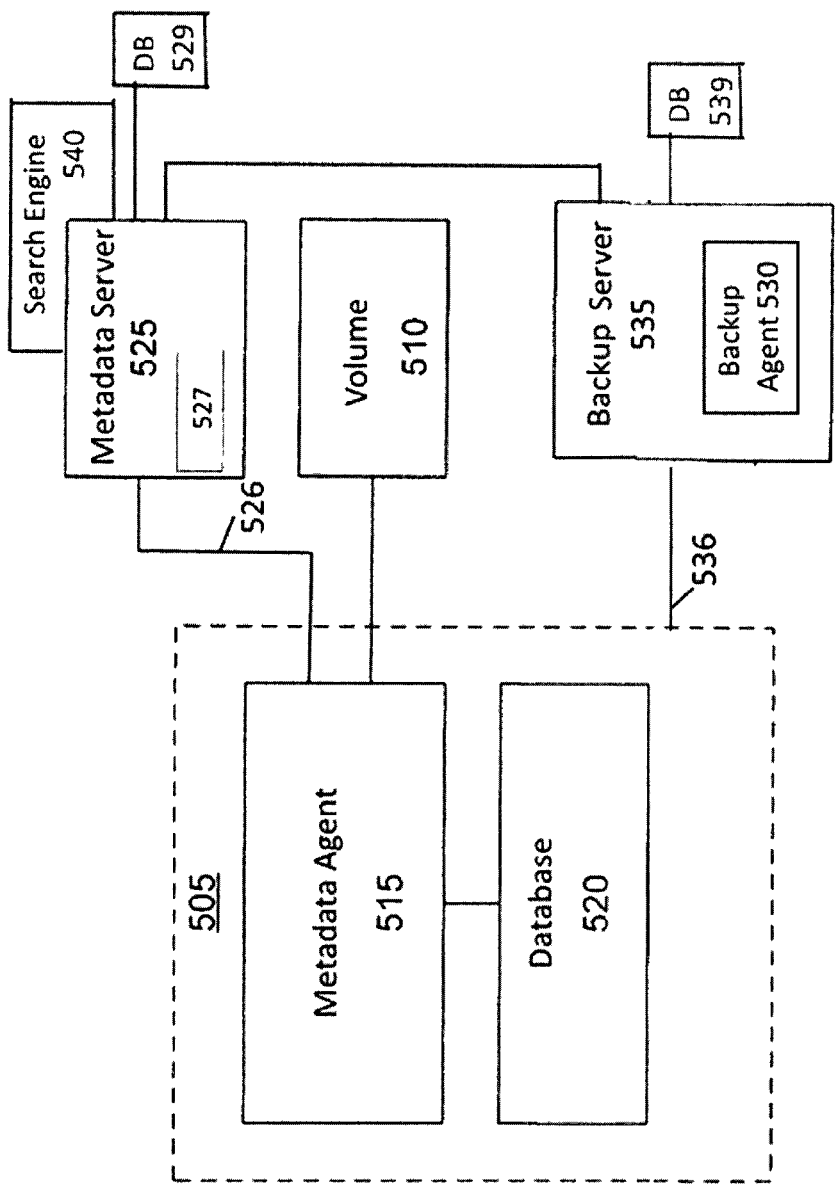
FIG. 5 shows a block diagram of an example of a client system 505, implemented in accordance with some implementations.

FIG. 5 shows a block diagram of an example of a client system 505, implemented in accordance with some implementations. For some embodiments, client system 505 may be a virtual machine (VM) running in a virtualized environment. The client system 505 may include a metadata agent 515. The metadata agent 515 may be implemented in software, hardware or a combination of both. For some embodiments, the metadata agent 515 may be configured to collect metadata associated with objects in a volume 510 used by the client system 505. An object may be a file, a folder, an application, etc. The metadata of an object may be referred to as object level metadata. For some embodiments, the metadata agent 515 may be loaded in memory of the client system 505, stay resident in the memory, and execute as a background task to collect the object level metadata in real time, including the first or base metadata and the subsequent incremental metadata changes. The object level metadata may include, for example, information about when an object is created, when the object is modified, when the object is saved, an object type, etc.

As a background task, the metadata agent 515 may not interact with a user and may not be visible to the user. The metadata agent 515 may be automatically loaded into the memory of the client system 505 at power on, or it may be started by an administrator of the client system 505. The metadata agent 515 may execute continuously until it is specifically terminated or until the client system 505 is powered off.

The client system 505 may be associated with one or more volumes such as the volume 510. The metadata agent 515 may initially collect the base metadata of the objects in the volume 510. For example, when an object (e.g., file or folder) is created, its initial metadata is considered as a base metadata. When the same object is subsequently modified or deleted, the changes to the metadata are considered the incremental metadata changes. The metadata agent 515 may collect the incremental metadata changes of the objects.

For some embodiments, the metadata agent 515 may be configured to temporarily store the incremental metadata changes locally in a database 520 or in a cache memory of the client system 505. In these embodiments, the incremental metadata changes will subsequently be transmitted to the metadata server 525 via communication channel 526. The transmission of the incremental metadata changes may be according to certain policies (e.g., periodic time interval, occurrence of an event such as a backup event, etc.). One advantage of temporarily storing the incremental metadata changes locally is the ability for the metadata agent 515 to consolidate the different incremental metadata changes and transmit only the consolidated metadata changes to the metadata server 525. The transmission of the consolidated metadata changes may be based on a consumer's request. For example, the metadata agent 515 may collect three different incremental metadata changes for a particular object during a certain time period. Instead of transmitting all three incremental metadata changes to the metadata server 525, the metadata agent 515 may examine and consolidate the three incremental metadata changes into a single consolidated metadata change. The consolidated metadata change may then be transmitted to the metadata server 525 on-demand or based on a policy (e.g., predetermined schedule). For example, when an object "A" is updated at time "t1", a first incremental metadata change for the object "A" is collected. When the object "A" is updated again at time "t2", a second incremental metadata change is collected. Instead of transmitting both the first and second incremental metadata changes to the metadata server 525, only the second incremental metadata change is transmitted to indicate that the object "A" was last updated at time "t2". This helps optimizing the performance of the metadata server 525. This also helps reducing the number of transmission between the metadata agent 515 and the metadata server 525. For some embodiments, the consolidation operations performed by the metadata agent 515 may be based a backup operation. For example, when the backup agent 530 is ready to cause transmission of the backup data to the backup server 535, the backup agent 530 may notify the metadata agent 515 causing the metadata agent 515 to consolidate the incremental metadata changes it collected and transmit the consolidated metadata change to the metadata server 525.

For some other embodiments, the incremental metadata changes collected by the metadata agent 515 may not be stored locally and may always be transmitted or published to the metadata server 525 in real time. A consolidation agent 527 in the metadata server 525 may be configured to consolidate the various incremental metadata changes to determine the consolidated metadata change for a particular object. The operation of the consolidation agent 527 may be on demand based on a request by the backup server 535. The metadata server 525 may store the incremental metadata changes in the metadata database 529.

Each incremental metadata change collected by the metadata agent 515 may be associated with information about when the incremental metadata change is created, information about the volume that the incremental metadata change is associated with, information about the client system (e.g., the client system 505), information about the path to the volume, information about the path to the objects, etc. This may enable searching the metadata based on certain search criteria.

In the virtualized environment, the client system 505 may be one of many virtual machines (VM). Each VM may be associated with its own metadata agent such as metadata agent 515. Each VM may also be associated with a shared backup agent such as the backup agent 530. The backup agent 530 may be configured to backup data in the volume 510. The backup operations performed by the backup agent 530 may include full backups and incremental change backups. Backup data may be transmitted to backup server 535 via communication channel 536. The backup data may be stored in the backup database 539 may include the content of the volumes as well as the metadata of the volumes and associated VM. It may also be noted that the communication channel 536 used by the backup agent 530 is distinct from the communication channel 526 used by the metadata agent 515. The separation of the communication channels 526 and 536 reduces any potential impact that may be caused by the transmission of the incremental metadata changes.

The metadata agent 515 may be configured to execute independently of any backup applications or backup agents such as backup agent 530. As more incremental metadata changes are received by the metadata server 525, a history of changes associated with the object level metadata may be stored by the metadata server 525. For some embodiments, the metadata server 525 may be configured to receive the incremental metadata changes from multiple metadata agents each associated with a different client system such as the client system 505.

The metadata server 525 may be coupled with the backup server 535. The backup server 535 may be associated with backup database 539. The backup database 539 may be configured to store backup data and backup metadata. The backup metadata may include backup point information, information about a VM, volume information, whether a backup is a full backup or an incremental backup, etc. For some embodiments, the backup metadata stored in the backup database 539 may be associated with the incremental metadata changes stored in the metadata database 529. The association may be performed by the metadata server 525 based on a request to perform a restore browsing or a search. The association may occur after the backup data has been received by the backup server 535, and after the incremental metadata changes have been received by the metadata server 525. The metadata server 525 may use the information received from the backup server 535 to construct a search criteria. The search engine 540 may query or search the metadata database 529 after the association using search criteria constructed by the metadata server 525. The search criteria may be different depending on what the backup server 535 needs. For example, the search criteria for a restore browse operation may include specific information about a host name, volume path, and point in time information related to the backup data. The search criteria for a search operation may be more general and its associated search result may cover a range of information related to multiple volumes between two points in time.

The search by the search engine 540 may yield information about the objects associated with the metadata that match the search criteria. The search result may also include information about time the objects were last updated, the client system associated with the objects and the path to the volume (e.g., root path) associated with the objects. The metadata server 525 may transmit the search result received from the search engine 540 to the backup server 535. The backup server 535 may filter the search results received from the metadata server 525 to find the desired result.

It may be possible that the number of incremental metadata changes collected by the metadata agent 515 is more than the number of backups performed during the same period. For example, the consolidation agent 527 may identify that the metadata server 525 has received four incremental metadata changes during the previous four hours, even though there has been only one backup during the same period. The consolidation agent 527 may consolidate all of the incremental metadata changes to form a consolidated metadata change.

Although the examples above refer to using the incremental metadata changes stored in the metadata database 529 in conjunction with the backup data stored in the backup server 535, the incremental metadata changes may also be used independently of the backup data. For example, the incremental metadata changes may be searched to determine information about a number of objects updated within a certain time period. It may be noted that embodiments of the invention may be applied to all image or block based backups including, for example, VM backup, snapshot, block-based backup for physical machines. Further, although FIG. 5 shows separate metadata server 525 and backup server 535, it may be possible that both servers 525 and 535 may be the same server with separate metadata functions and backup functions.

Figure 6:
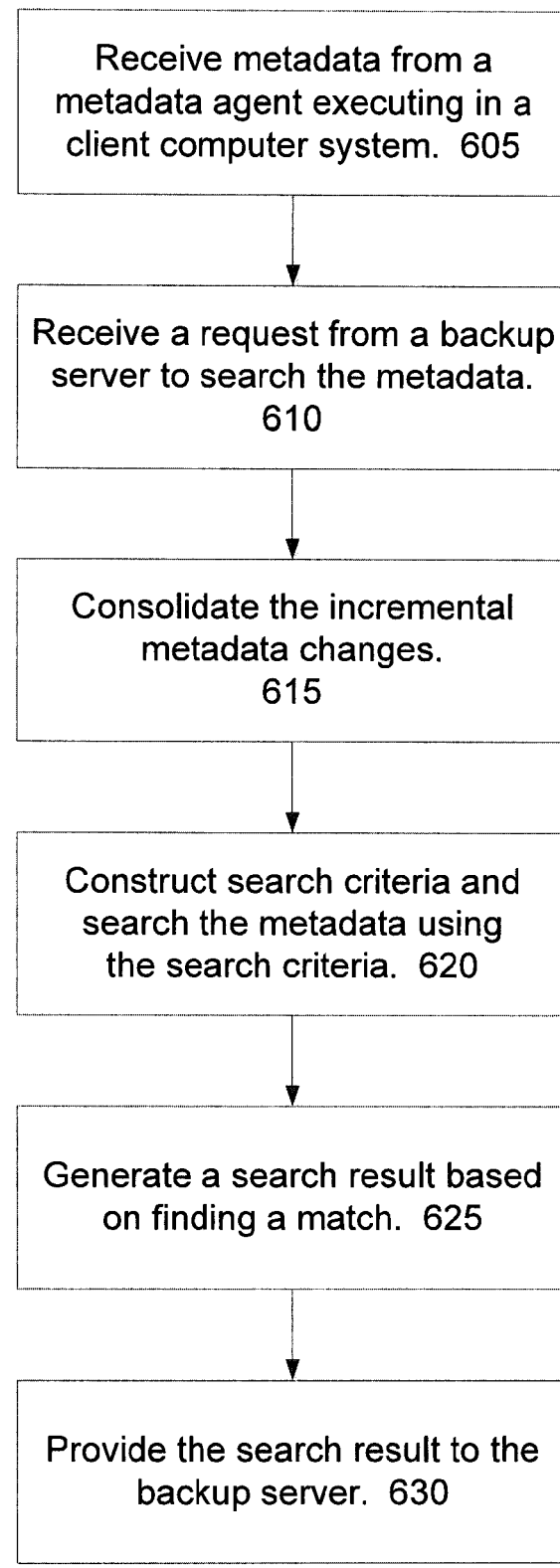
FIG. 6 shows a flow diagram that describes a process for using the captured metadata with the backup data, performed in accordance with an exemplary embodiment.

FIG. 6 shows a flow diagram that describes a process for using the collected incremental metadata changes with the backup data, performed in accordance with an exemplary embodiment. At block 605, the incremental metadata changes are received from a metadata agent by the metadata server. The incremental metadata changes may be associated with objects used in a client computer system coupled to the metadata server. Base metadata associated with the objects may also be received by the metadata server 525. The incremental metadata changes may be saved in a database associated with the metadata server. The incremental metadata changes may have been consolidated by the metadata agent in the client computer system. Alternatively, the incremental metadata changes may be consolidated by the consolidation agent 527 in the metadata server 525. A client computer system may be a VM in the virtualized environment. The metadata agent may remain resident in the memory of the client computer system to continuously monitor for incremental metadata changes of objects associated with the client computer system. The metadata agent may operate independently of any other applications or agents running in the client computer system.

At block 610, a request to browse or search the metadata stored in the metadata database 529 may be received by the metadata server 525. As described, the metadata stored in the metadata database 529 are object level metadata may include the base metadata and the incremental metadata changes. The request may be initiated by the backup server such as the backup server 535 shown in FIG. 5. For example, the backup server 535 may query the backup metadata for information about available backup points. The backup server 535 may determine to get more details about the metadata of the objects associated with a particular backup point. The backup server 535 may then send a request to the metadata server 525. The request may also include information that enables the metadata server 525 to construct the search criteria. For example, the search criteria may be constructed using the host name, path, point-in-time information included in the request sent by the backup server 535.

At block 615, the request may cause the incremental metadata changes stored in the metadata database 529 to be consolidated. For example, the consolidation may remove duplicate information and out of date information. The request may also cause the metadata stored in the metadata database 529 to be associated with the backup metadata of the backup server 535. The backup metadata of the backup server 535 may include information about point in time when the backup data is created, related client information, related path name, and the volume that the backup data is associated with, etc. The metadata server 525 may use the information in the request from the backup server 535 to construct a search criteria. The metadata server 525 may then send the search criteria to the search engine 540.

At block 620, the search criteria may be used by the search engine 540 to query the metadata stored in the metadata database 539 to determine if there is a match.

At block 625, a search result may be generated by the search engine 540. The search result may be processed or filtered by the metadata server 525. For example, if the request from the backup server 535 was a browse request, then the search result may include specific information about the metadata associated with specific host name, volume name, path information, point-in-time, etc. The metadata server 525 may filter the search result to remove any duplicates and send the filtered search result to the backup server 535. If the request is a search request, the metadata server 525 may not need to perform filtering operations because the metadata server 525 may not know what point-in-time may be relevant to the backup server 535. The metadata server 525 may therefore send the entire search result to the backup server 535. The backup server 535 may then perform its own filtering to get the desired results based on the available backup points.

At block 630, the result may be transmitted by the metadata server 525 to the backup server 535. When the result includes a range of information, the backup server 515 may need to filter the result to find the desired result. The backup server 535 may then use the result to search the backup data stored in the backup database 539 associated with the backup server 535. The process described in FIG. 6 enables delivering point-in-time restore browsing view or search for backup objects by associating the object-level metadata collected in real time with image-level (or volume level) backup metadata on demand.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment.

What is claimed is:

1. A computer-implemented method comprising:
receiving, by a metadata server, incremental metadata changes associated with objects in a client computer system, the incremental metadata changes collected in real time by a metadata agent executing in the client computer system;
storing, by the metadata server, the incremental metadata changes in a metadata database associated with the metadata server;
receiving, by the metadata server and from a backup server, a request to search the metadata database for metadata of the objects associated with a particular backup point, the request including information enabling the metadata server to construct search criteria, the information including at least point-in-time information;
consolidating, by the metadata server, the incremental metadata changes to form a single consolidated metadata change in response to receiving the request to search the metadata database from the backup server and in response to determining a number of the incremental metadata changes collected exceeds a number of backups performed during a time period, the single consolidated metadata change applying all of the incremental metadata changes;
associating, by the metadata server, the single consolidated metadata change with backup metadata associated with the backup server coupled to the metadata server in response to receiving the request to search the metadata database from the backup server; and
searching, by the metadata server, the metadata database based on a search criteria, the search criteria being generated by the metadata server using the information included in the received request from the backup server.

2. The method of claim 1, further comprising providing a search result to the backup server when there is a match in the metadata database based on the search criteria.

3. The method of claim 1, wherein said associating is performed in real time.

4. The method of claim 3, wherein the incremental metadata changes are received from the metadata agent over a communication channel independent of a communication channel used to transmit backup data from the client computer system to the backup server.

5. The method of claim 4, wherein the backup metadata is associated with the backup data and include information about the backup data.

6. The method of claim 5, wherein the incremental metadata changes received from the metadata agent includes at least host name information associated with the client computer system, volume and path information associated with a volume, and path information associated with the objects.

7. A computer program product comprising computer-readable program code to be executed by one or more processors when retrieved from a non-transitory computer-readable medium, the program code including instructions to:
- receive, by a metadata server, incremental metadata changes associated with objects in a client computer system, the incremental metadata changes collected in real time by a metadata agent executing in the client computer system;
- store, by the metadata server, the incremental metadata changes in a metadata database associated with the metadata server;
- receive, by the metadata server and from a backup server, a request to search the metadata database for metadata of the objects associated with a particular backup point, the request including information enabling the metadata server to construct search criteria, the information including at least point-in-time information;
- consolidate, by the metadata server, the incremental metadata changes to form a single consolidated metadata change in response to receiving the request to search the metadata database from the backup server and in response to determining a number of the incremental metadata changes collected exceeds a number of backups performed during a time period, the single consolidated metadata change applying all of the incremental metadata changes;
- associate, by the metadata server, the single consolidated metadata change with backup metadata associated with the backup server coupled to the metadata server in response to receiving the request to search the metadata database from the backup server; and
- search, by the metadata server, the metadata database based on a search criteria, the search criteria being generated by the metadata server using the information from the received request from the backup server.

8. The computer program product of claim 7, wherein the program code includes further instructions to provide a search result to the backup server when there is a match in the metadata database based on the search criteria.

9. The computer program product of claim 7, wherein said associating is performed in real time.

10. The computer program product of claim 9, wherein the incremental metadata changes are received from the metadata agent over a communication channel independent of a communication channel used to transmit backup data from the client computer system to the backup server.

11. The computer program product of claim 10, wherein the backup metadata is associated with the backup data and include information about the backup data.

12. The computer program product of claim 11, wherein the incremental metadata changes received from the metadata agent includes at least host name information associated with the client computer system, volume and path information associated with a volume, and path information associated with the objects.

13. A system comprising:
a processor-based application, which when executed on a computer having one or more processors, will cause the one or more processors to:
- receive, by a metadata server, incremental metadata changes associated with objects in a client computer system, the incremental metadata changes collected in real time by a metadata agent executing in the client computer system;
- store, by the metadata server, the incremental metadata changes in a metadata database associated with the metadata server;
- receive, by the metadata server and from a backup server, a request to search the metadata database for metadata of the objects associated with a particular backup point, the request including information enabling the metadata server to construct search criteria, the information including at least point-in-time information;
- consolidate, by the metadata server, the incremental metadata changes to form a single consolidated metadata change in response to receiving the request to search the metadata database from the backup server and in response to determining a number of the incremental metadata changes collected exceeds a number of backups performed during a time period, the single consolidated metadata change applying all of the incremental metadata changes;
- associate, by the metadata server, the single consolidated metadata change with backup metadata associated with the backup server coupled to the metadata server in response to receiving the request to search the metadata database from the backup server; and
- search, by the metadata server, the metadata database based on a search criteria, the search criteria being generated by the metadata server using the information from the received request from the backup server.

14. The system of claim 13, wherein the one or more processors is further configured to provide a search result to the backup server when there is a match in the metadata database based on the search criteria.

15. The system of claim 13, wherein said associating is performed in real time.

16. The system of claim 15, wherein the incremental metadata changes are received from the metadata agent over a communication channel independent of a communication channel used to transmit backup data from the client computer system to the backup server.

17. The system of claim 16, wherein the backup metadata is associated with the backup data and include information about the backup data, and wherein the incremental metadata changes received from the metadata agent includes at least host name information associated with the client computer system, volume and path information associated with a volume, and path information associated with the objects.

* * * * *